March 18, 1930. E. E. WEMP 1,750,828
CLUTCH
Filed Aug. 24, 1927 2 Sheets-Sheet 1

INVENTOR.
Ernest E. Wemp
BY Stuart C. Barnes
ATTORNEY.

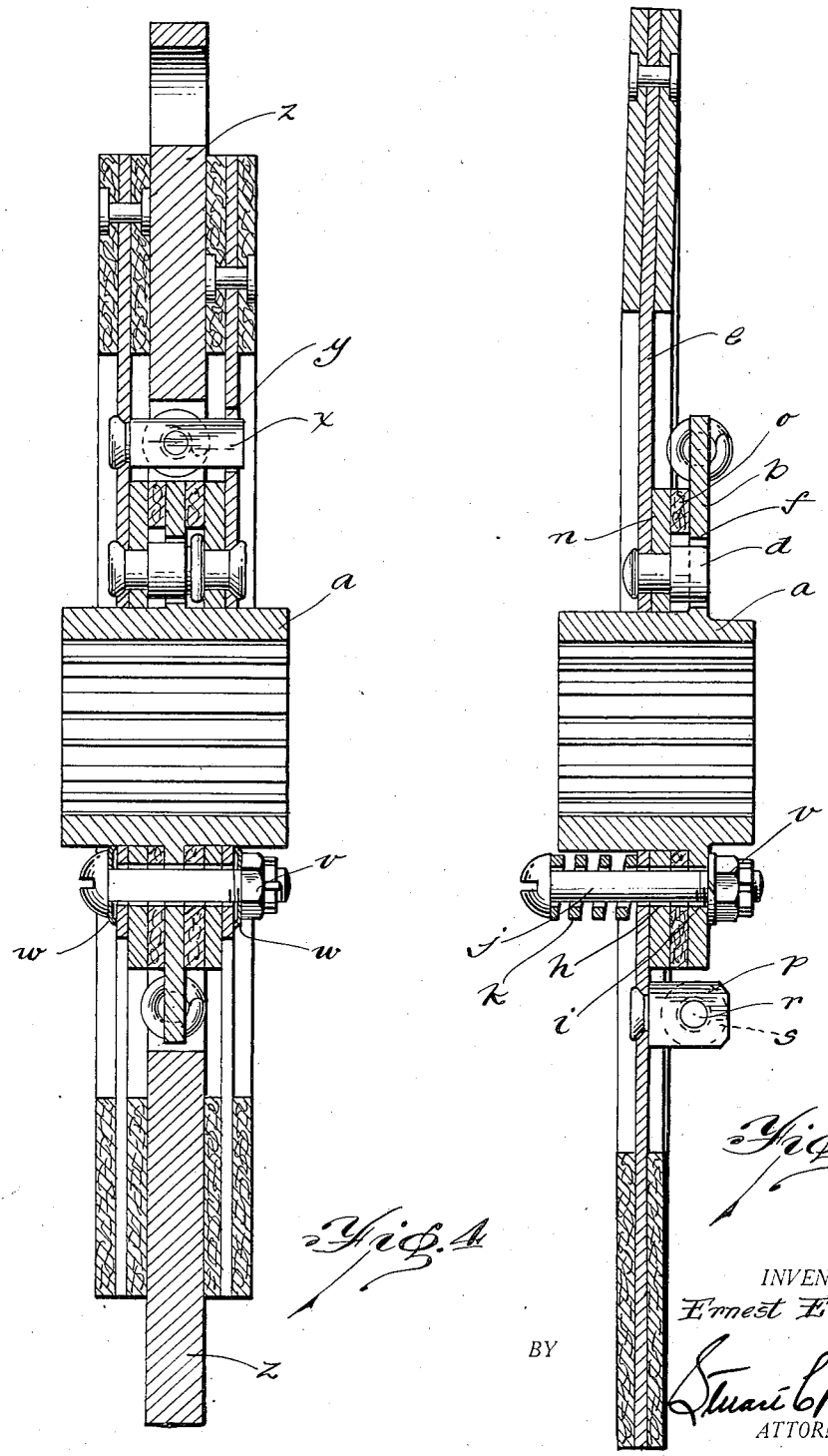

Patented Mar. 18, 1930

1,750,828

UNITED STATES PATENT OFFICE

ERNEST E. WEMP, OF DETROIT, MICHIGAN

CLUTCH

Application filed August 24, 1927. Serial No. 215,171.

This invention relates to clutches, and has for its object a clutch with a skeletonized facing-carrying structure for the driven member to lessen the inertia forces.

A further object is an arrangement between the driven disk and the driven disk hub which serves to absorb shocks due to the sudden speed changes and which also serves to dampen the vibrations.

Referring to the drawings:

Fig. 3 is a section taken on line 3—3 of Fig. 1.

Fig. 4 is a section taken on line 4—4 of Fig. 2.

In my prior applications Serial Nos. 158,507 and 161,031 I have described and shown combined shock absorbers and dampeners in connection with clutch driven members. The above applications have matured into patents numbered 1,700,244 and 1,734,101, respectively. In application 158,507 this combination is broadly claimed. However, in my prior applications the spring action which is utilized both for shock absorbing and for returning the relatively movable parts to a centralized position is furnished by flat torsion springs which have some infirmities in actual practice. It is the object of the present invention to provide a driven plate or plate assembly in which both the dampening action and the shock absorbing action is secured and in which the spring action is furnished by the old reliable coil spring.

$a$ designates the hub of the driven disk which is provided with a flange $b$. $d$ is the stud for keying the spoked driven disk $e$ to the hub flange $b$. However, the perforation $f$ in the flange is considerably larger than the stud and consequently gives lost motion. The same is true of the perforations $h$ and $i$ through the disk and flange for the purpose of receiving the bolt $j$ around which is coiled the pressure spring $k$. This spring packs the flange $b$ and the reinforcing disk $n$ together on to the brake disk $o$. The friction of these disks which resists relative movement of the parts permissible by reason of the lost motion referred to above serves to dampen vibrations as explained in my previous applications.

The disks have studs $p$ riveted thereto to form spring abutments. These studs are provided with centralizing pins $r$ for the coil springs $s$. The hub flange is provided with lugs $t$ which also form spring abutments and these are provided with spring-centralizing pins $u$. The coil springs $s$ are coiled and interposed between the spring abutments formed by the lugs on the spoked disk and the lugs on the hub flange and serve two functions namely; to resist sudden change of speed such as starting or stopping or sudden changes in acceleration or deceleration; and secondly, they cooperate with the vibration dampener to centralize the parts so that there may be lost motion in either direction and the vibration dampener may always work.

The amount of pressure on the friction members that form the vibration dampener can be adjusted by altering the adjustment of the nuts $v$. I am aware that coil springs have heretofore been used between the driven disk and its hub, but so far as I am advised no driven member assembly has heretofore been designed in which the coil springs were so made and so assembled that they could be, and were intended to be, used conjointly with friction disks to act both as shock absorbers and centralizers in connection with the friction dampener.

Figure 1:
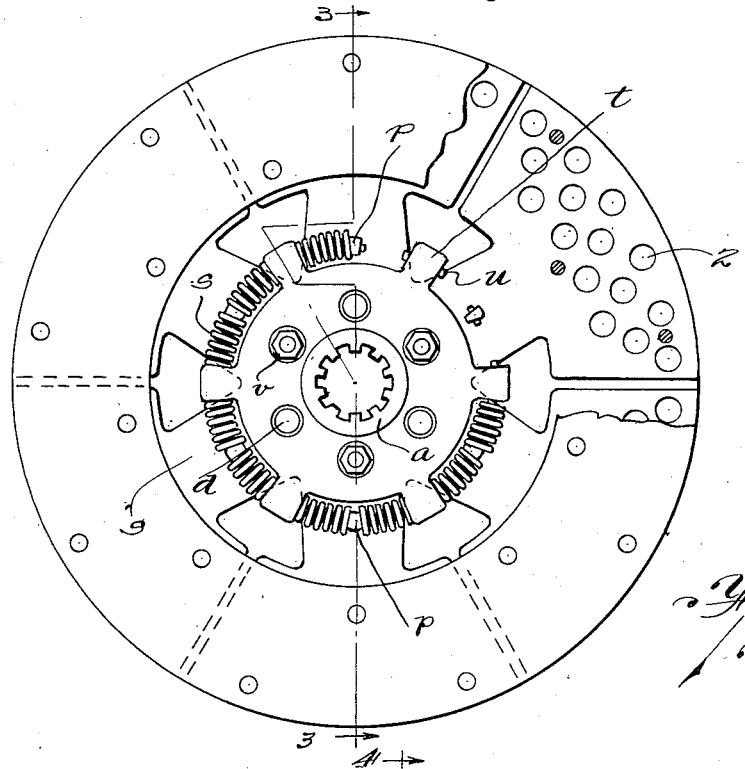
Fig. 1 is an elevation of the driven disk with a portion of the facing broken away to show the skeletonized structure.
Figure 2:
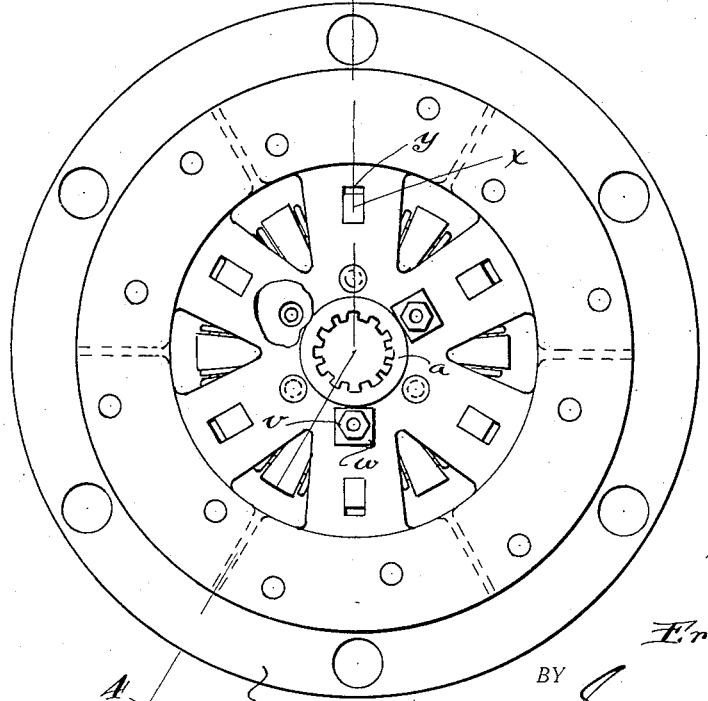
Fig. 2 is an elevation of the multiple disk driving and driven plate assembly.

The form of the invention shown in Figs. 2 and 4 is applied to a plural driven disk clutch or what is commonly called a multiple disk clutch, in counter-distinction to the so-called single plate clutch. The embodiment is very similar to that shown in Figs. 1 and 3. In place of a coil spring for applying the pressure to the friction members, springs washers $w$ may be used. The spring abutment studs $x$ are riveted to one disk and pass clear through the disk on the other side through an opening with clearance $y$.

In Fig. 1 I have shown the skeletonized spoke disk. The perforations 2 are preferably stamped through the enlarged spoke heads for the purpose of very much lightening the facing-carrying heads so as to lessen the inertia forces of the disk. This secures smoother clutch operation and yet leaves the spoke portions of the disk made of heavy material which is capable of transmitting the driving torque.

What I claim is:

1. In a clutch, the combination of a driven disk provided with laterally projecting spring-abutment studs, a hub provided with a hub flange having spring-abutment lugs and an annulus of coil springs interposed between the lugs and the studs for yieldingly resisting the relative movement, the said coil springs acting as shock absorbers and centralizers in a small lost motion between the disk and hub flange, and means entirely enclosed in said annulus for dissipating energy during such lost motion.

2. In a clutch, the combination of a driven clutch disk, a hub with a flange, interposed friction means between the flange and disk and around the hub, and an annulus of coiled springs with their ends alternately connected to the flange and disk and peripherally enclosing the said friction means.

3. In a clutch, the combination of a driven clutch disk, a hub with a flange, of coil springs with their ends alternately connected to the flange and disk and carried at the side of the driven disk, means between the flange and disk for dissipating energy upon relative movement, and means for tying the flange and disk together for permitting a limited relative movement within the range of movement of the said springs.

4. In a clutch, the combination of a driven clutch disk provided with a face arranged for engagement with the driving disk face, a hub with a flange disposed in substantial parallelism with the center portion of the driven disk at one side thereof, a friction material arranged between the center portion of the driven disk and the flange, means for yieldingly packing the flange, friction material, and center portion of the driven disk together, the said disk and flange capable of relative movement and yieldable compression members connecting the driven disk to the hub flange and carried on the side of the driven disk.

In testimony whereof I affix my signature.

ERNEST E. WEMP.